(No Model.)
L. W. BATES.
DISCHARGE PIPE FOR DREDGERS.
No. 548,503. Patented Oct. 22, 1895.
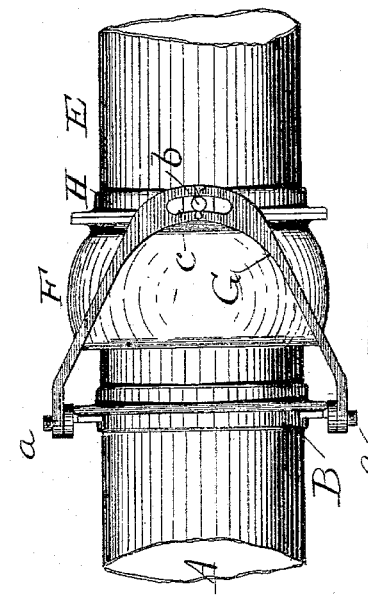
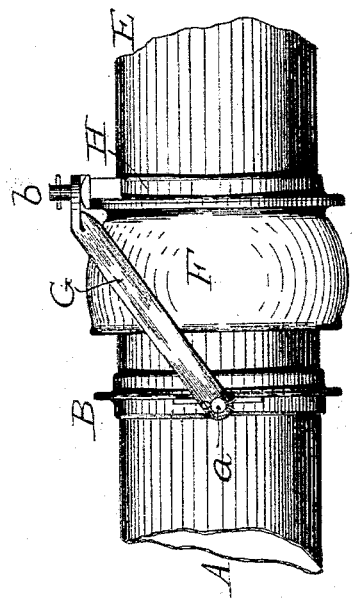
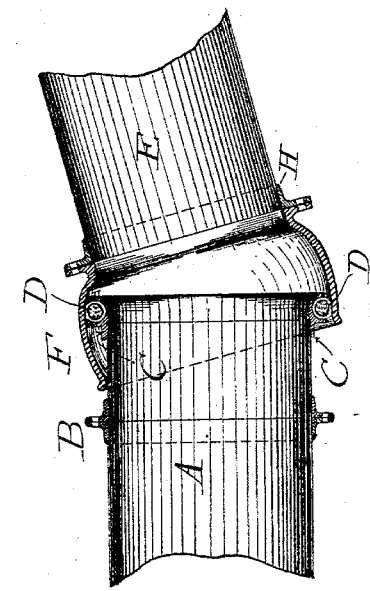
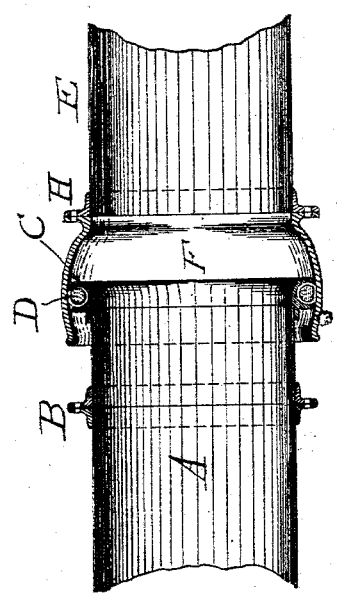
WITNESSES:
C. C. Burdine
C. B. Bull.
Lindon W. Bates INVENTOR
BY Dodge & Sons
ATTORNEYS.

UNITED STATES PATENT OFFICE.

LINDON W. BATES, OF CHICAGO, ILLINOIS.

DISCHARGE-PIPE FOR DREDGERS.

SPECIFICATION forming part of Letters Patent No. 548,503, dated October 22, 1895.

Application filed March 4, 1895. Serial No. 540,524. (No model.)

*To all whom it may concern:*

Be it known that I, LINDON W. BATES, a citizen of the United States, residing at Chicago, in the county of Cook and State of Illinois, have invented certain new and useful Improvements in Discharge-Pipes for Dredgers, &c., of which the following is a specification.

My invention relates to pipe-joints, and is designed particularly for use in connection with the discharge-pipe of hydraulic dredgers, though applicable, of course, to other uses.

In the drawings, Figures 1 and 3 are horizontal longitudinal sectional views; Fig. 2, a side elevation, and Fig. 4 a top plan view.

A indicates a pipe provided near one end with a flanged encircling band B, and at its other end with a grooved ring or collar C, as shown in Figs. 1 and 3.

In the groove of collar C is an annular tube D, which will be provided with a filling pipe or tube, (not shown,) said tube or pipe D being in all respects similar to the pneumatic tires now used on bicycles—that is to say, the tube or pipe D is provided with a short small filling-tube, which is provided with a removable cap, and which filling-tube, projecting slightly beyond and through the collar C, may be connected with a pump, so as to inflate the tube D when the parts are brought to the position shown in Fig. 3.

E indicates the pipe to be connected with pipe A, and which pipe E is provided with an enlarged mouthpiece F, whose inner surface is made concave and whose outer end or mouth is of a diameter about equal to or slightly greater than the diameter of collar C, so as to permit the end of pipe A to be inserted into the mouthpiece F. After the end of the pipe A has thus been inserted the annular tube D will be inflated with air or water to an extent that will preclude the pipe A from being withdrawn from the pipe E, the tube D being caused to bear with considerable force against the concave surface of the mouthpiece with sufficient pressure to preclude leakage.

In order to prevent the pipes A and E from being forcibly pulled away from each other, I employ a bail G, which extends from the top of one pipe down to the sides of the other pipe, said bail being pivotally connected at its ends to studs a, secured to ring or band B, and at its center by means of a slotted connection b c to a ring or band H, secured to pipe E. By this means movement of the pipe-sections relatively to each other is permitted.

While I prefer to employ the rings or bands B and H, they are not essential, the pivotal studs obviously being capable of direct attachment to the pipes.

The construction shown may, if desired, be reversed—that is, the bail G may be connected with the top of pipe A and with the sides of pipe E—and it is also obvious that the mouthpiece may be formed on pipe A and the collar and tube applied to pipe E.

When the invention is applied to the discharge-pipe of dredgers, the respective sections will each be provided at one end with the mouthpiece and at the other end with the collar and tube.

The construction herein shown and described is particularly valuable in connection with dredge discharge-pipes, as it is practically impossible to employ the ordinary hose connection without restricting the flow when the sections are not in a straight line.

The collar C may be made integral with the pipe A, if desired; or it may consist simply of two bands separated from each other slightly to afford a space or groove for the annular tube D; but as these ideas involve merely mechanical skill illustration is not deemed necessary.

Having thus described my invention, what I claim is—

1. In combination with pipe A provided with grooved collar C; pipe E provided with mouth piece F; and an annular tube seated in said collar and adapted to be expanded to bear against the inner face of the mouth piece, substantially as shown and described.

2. In combination with pipe A provided with grooved collar C; pipe E provided with mouth piece F; an annular tube seated in said collar and adapted to be expanded to bear against the inner face of the mouth piece; and a pivotal connection between the two pipes.

3. In combination with pipe A provided with grooved collar C; pipe E provided with mouth piece F; annular tube D seated in the groove and adapted to be expanded to bear against the inner face of the mouth piece; and a bail G connected at its ends to the side of one pipe, and at its center to the top of the other pipe.

4. In combination with pipe A provided with collar C, tube D, and band B; pipe E provided with mouth piece F and band H; a stud $b$ projecting from band H; studs $a\,a$ projecting from band B; and a bail G connected at its ends with studs $a\,a$, and slotted to receive stud $b$.

5. In combination with two pipes; means for flexibly connecting the pipes; a mouth piece secured to one of said pipes; and an annular tube applied to the other pipe and designed to be expanded by a fluid so as to bear with pressure against the mouth piece.

In witness whereof I hereunto set my hand in the presence of two witnesses.

LINDON W. BATES.

Witnesses:
CHAS. H. WHITING,
J. H. GLENDENING.